Patented Mar. 26, 1935

1,995,568

UNITED STATES PATENT OFFICE 1,995,568

PROCESS OF PREPARING CHLOROCRESOLS

Constantin Jacobi and Bertram Wolf, Frankfort-on-the-Main-Griesheim, Germany, assignors to I. G. Farbenindustrie Aktiengesellschaft, Frankfort-on-the-Main, Germany No Drawing. Application October 12, 1931, Serial No. 568,518. In Germany October 29, 1930

10 Claims. (Cl. 260—154)

The present invention relates to a process of preparing chlorocresols.

Homogeneous, higher nuclear chlorinated cresols, such as trichlorocresol, cannot be prepared in a technical scale by directly chlorinating the cresols because oxidation to quinone-like compounds takes place as soon as the dichloro stage has been reached. The removal of these quinone-like compounds requires a troublesome purification process whereby considerable losses of the chlorinated products are caused. The hitherto known trichlorocresols have been prepared by chlorinating the corresponding chloro-toluidines and reducing the hexa-chloroketones thus obtained. Only when starting from meta-cresol, a trichloro compound can be prepared by direct chlorination because in this case the ortho-positions and the para-position to the hydroxy-group are unsubstituted. However, because of the high price of meta-cresol used as starting material, this process for preparing trichloro-cresol is uneconomical.

We have now found that the mono or poly-nuclear substituted cresols can be prepared in a simple and cheap manner by first chlorinating in a known manner toluene or lower substituted chlorotoluenes, whereby a mixture of higher nuclear chlorinated toluenes is obtained, the chlorine content of which depends on the conditions applied during the chlorination process, and then subjecting this mixture to the action of alkali metal hydroxides in an alcoholic or aqueous alcoholic solution. Our invention is based on the discovery that as to the action of alkali-hydroxides the reactivity of the chlorine atoms of the various chlorination products depends on the temperature applied in such a manner that one chlorine atom of a higher nuclear chlorinated cresol is replaced by a hydroxy-group at a temperature which is about 20° C. lower than the temperature required for replacing one chlorine atom of the next lower chlorinated toluene by a hydroxy-group. A penta-chlorinated toluene is transformed into the next lower chlorinated cresol by the action of alcoholic alkali metal hydroxide at a temperature of about 140° C. to 150° C., a tetrachlorinated toluene at about 160° C. to 170° C., a trichlorotoluene at about 180° C. to 190° C., and the corresponding dichloro compound at about 200° C. to 210° C. It is evident therefrom that by applying a temperature of about 160° C. to 170° C. when reacting with alcoholic alkali metal hydroxide upon a mixture containing tetrachlorinated toluene as the highest chlorination product, only the said tetra-chlorotoluene is transformed in the desired manner, whereas the lower chlorinated toluenes remain unchanged. In the same manner, tetra-chlorocresol can be obtained from a mixture containing pentachlorotoluene as the highest chlorination product by using a temperature of about 140° C. to 150° C. and so on.

From these statements it is evident that the temperature to be applied for the transformation of the polychlorinated toluene into the next lower chlorinated cresol follows an exactly defined rule. If a polychlorinated toluene is replaced by the next lower chlorinated toluene, the temperature required for the transformation into the cresol rises in each case about 20° C. If the polychlorinated toluenes to be used as starting material are designated by the following probable formula

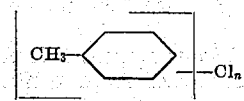

wherein the $n$ stands for the numbers 2, 3, 4 or 5, a comparison of the afore-named data shows that the temperature to be applied amounts to about 245° minus 20 times $n$ °C. If in this equation for instance the value 5 is inserted instead of $n$, it follows that the transformation of penta-chlorotoluene into tetrachlorocresol requires a temperature of about 245° C. minus 5 times 20, that is about 145° C. All the remaining chlorination stages to be applied in this case follow the same rule.

The chlorocresols obtained by this new process can be removed from the reaction mixture by eliminating the solvent whereupon the unchanged chlorotoluenes separate. From the residue, containing the chlorocresol in form of its alkali metal salts, the crude chlorinated cresol is obtained by the addition of an acid.

The amount of the alkali metal hydroxide to be used depends on the amount of the chlorine which is to be exchanged by the hydroxy-group. Inasmuch as the composition of the chlorination mixture and particularly its content of the highest chlorinated toluene depends on the conditions applied during the chlorination process, as is well known in the art, there is no difficulty in determining how much alkali metal hydroxide is required for transforming one chlorine of the highest chlorinated toluene into a hydroxy-group.

The alkali metal hydroxide can be used in an alcoholic or aqueous alcoholic solution.

The reaction is suitably performed under pressure, preferably in a closed vessel.

The following examples serve to illustrate the invention, but they are not intended to limit it thereto:

1. 500 kilos of crude tetrachlorotoluene containing about 66 per cent. of pure tetrachlorotoluene, the rest being trichlorotoluene are heated for 15 hours to 160° C.–170° C. together with 800 kilos of methanol and 400 kilos of caustic soda solution of 35 per cent. strength. During the distillation of the methanol the unchanged trichlorotoluene precipitates. The caustic soda solution is separated and acidified; during this operation the mixture of trichlorocresol separates in form of an oil which solidifies at about 65° C. It can be obtained as a colorless mass in a pure condition by distillation in the vacuum. The yield of crude trichlorocresol amounts to 290 kilos and almost corresponds to the theoretical quantity which was to be expected from the crude tetrachlorotoluene used.

As the technical tetrachlorotoluene obtained by chlorinating toluene or substituted chlorotoluenes consists of mixtures of different isomers, no uniform product but a mixture of isomers, is obtained when converting them into trichlorocresol.

2. 500 kilos of crude pentachlorotoluene containing about 70 per cent. of pure pentachlorotoluene, the rest being tetrachlorotoluene, are heated in a pressure vessel for 10 hours to 140° C.–150° C. together with 800 kilos of methanol and 160 kilos of potassium hydroxide. After the methanol has been distilled and diluted with water, the aqueous lye is separated from the non-converted product and acidified. About 240 kilos of practically pure 2.3.5.6.-tetrachlorocresol are obtained.

3. In an analogous manner it is possible to prepare tetrachlorocresol from pentachlorotoluene containing tetrachlorotoluene by observing a temperature of about 140° C.–150° C. during the action of the alcoholic solution of alkali metal hydroxide; during this operation the tetrachlorotoluene remains unaltered.

4. In order to obtain dichlorocresol from trichlorotoluene containing dichlorotoluene, the reaction must be performed at about 180° C.–190° C. for leaving the dichlorotoluene in an unchanged condition.

5. Finally in an analogous manner there can be obtained monochlorocresol from a mixture of mono- and dichlorotoluene of the reaction temperature is maintained at about 200° C.–210° C., the monochlorotoluene not taking part in the reaction.

In the following claims the term "exchangeable chlorine atom" means the one chlorine atom of the highest chlorinated product which under the conditions applied is to be replaced by a hydroxy-group.

We claim:—

1. The process which comprises acting in a closed vessel with an about theoretical amount of alcoholic alkali metal hydroxide calculated upon the amount of the compound containing the exchangeable chlorine atom, upon a mixture of higher chlorinated toluenes at a temperature within the range of from about 140° to about 210° C. which is about 20° C. lower than that required for reacting the next lower chlorination product with alcoholic alkali.

2. The process which comprises acting in a closed vessel with an about theoretical amount of an alcoholic-aqueous solution of alkali metal hydroxide, calculated upon the amount of the compound containing the exchangeable chlorine atom, upon a mixture of higher chlorinated toluenes at a temperature within the range of from about 140° to about 210° C. which is about 20° C. lower than that required for reacting the next lower chlorination product with alcoholic alkali.

3. The process which comprises reacting at a temperature of about 160° C. to 170° C. with an about theoretical amount of an alcoholic-aqueous solution of alkali metal hydroxide calculated upon the amount of the compound containing the exchangeable chlorine atom, upon a mixture of crude tetrachlorotoluene containing about 66 per cent. of tetrachlorotoluene as the highest chlorination product.

4. The process which comprises reacting at a temperature of about 140° C. to 150° C. with an about theoretical amount of an alcoholic solution of alkali metal hydroxide, calculated upon the amount of the compound containing the exchangeable chlorine atom, upon a mixture of crude pentachlorotoluene containing about 70 per cent. of pentachlorotoluene as the highest chlorination product.

5. The process which comprises acting in a closed vessel with an about theoretical amount of alcoholic alkali metal hydroxide, calculated upon the amount of the compound containing the exchangeable chlorine atom, upon a mixture of higher chlorinated toluenes, the average chlorine content of which ranges from 2 to 5 chlorine atoms per molecule of toluene at a temperature between about 140° and about 210° C., the temperature being the higher the lower the chlorine content of the mixture.

6. The process which comprises acting in a closed vessel with an about theoretical amount of alcoholic alkali metal hydroxide, calculated upon the amount of the compound containing the exchangeable chlorine atom, upon a mixture of higher chlorinated toluenes at temperatures of about from 140° to about 210° C., applying the lowest temperature of said range when employing the highest chlorinated toluene as starting material.

7. The process which comprises reacting an isomeric, crude, polychlorinated toluene of the probable formula:

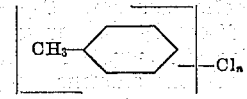

wherein the $n$ stands for the numbers 2, 3, 4 or 5, with an about theoretical amount of alcoholic alkali metal hydroxide, calculated upon the amount of the compound containing the exchangeable chlorine atom at a temperature of about 245° minus 20 times $n$ °C., wherein the value of $n$ is the same as that selected for $n$ in the formula above.

8. The process which comprises reacting in a closed vessel an isomeric, crude, poly-chlorinated toluene of the probable formula:

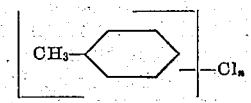

wherein the $n$ stands for the numbers 2, 3, 4 or 5, with an about theoretical amount of alcoholic alkali metal hydroxide, calculated upon the amount of the compound containing the exchangeable chlorine atom at a temperature of about 245° minus 20 times $n$ °C., wherein the value of $n$ is the same as that selected for $n$ in the formula above.

9. The process which comprises reacting in a closed vessel an isomeric, crude, poly-chlorinated toluene of the probable formula:

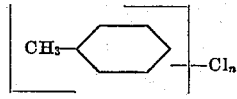

wherein $n$ stands for the numbers 2, 3, 4 or 5, with an about theoretical amount of an alcoholic aqueous solution of alkali metal hydroxide, calculated upon the amount of the compound containing the exchangeable chlorine atom at a temperature of about 245° minus 20 times $n$ °C., wherein the value of $n$ is the same as that selected for $n$ in the formula above.

10. The process which comprises reacting at a temperature of about 180° C. to 190° C. with an about theoretical amount of an alcoholic solution of alkali metal hydroxide, calculated upon the amount of the exchangeable chlorine atom, upon a mixture of crude trichlorotoluene containing trichlorotoluene as the highest chlorination product.

CONSTANTIN JACOBI.
BERTRAM WOLF.